United States Patent
Trimberger

(10) Patent No.: US 10,325,646 B1
(45) Date of Patent: Jun. 18, 2019

(54) SRAM PHYSICALLY UNCLONABLE FUNCTION (PUF) CIRCUIT AND METHOD

(71) Applicant: Xilinx, Inc., San Jose, CA (US)

(72) Inventor: Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 209 days.

(21) Appl. No.: 14/854,870

(22) Filed: Sep. 15, 2015

(51) Int. Cl.
| | |
|---|---|
| H04L 29/06 | (2006.01) |
| G11C 11/413 | (2006.01) |
| H03K 19/177 | (2006.01) |
| H03K 19/003 | (2006.01) |
| G06F 21/75 | (2013.01) |
| G06F 21/76 | (2013.01) |
| G11C 5/14 | (2006.01) |

(52) U.S. Cl.
CPC ............ *G11C 11/413* (2013.01); *G06F 21/75* (2013.01); *G06F 21/76* (2013.01); *G11C 5/14* (2013.01); *H03K 19/003* (2013.01); *H03K 19/1776* (2013.01)

(58) Field of Classification Search
CPC .................................. G06F 3/062; H04L 29/00
See application file for complete search history.

(56) References Cited

U.S. PATENT DOCUMENTS

| | | | |
|---|---|---|---|
| 7,852,701 B1 | 12/2010 | Trimberger | |
| 9,202,554 B2 * | 12/2015 | Chu | ................. G11C 29/06 |
| 2013/0194886 A1 * | 8/2013 | Schrijen | ................. G06F 7/588 |
| | | | 365/226 |
| 2014/0258736 A1 * | 9/2014 | Merchan | ................. G06F 21/62 |
| | | | 713/193 |
| 2014/0325237 A1 * | 10/2014 | Van Der Leest | ..... H04L 9/0866 |
| | | | 713/189 |

* cited by examiner

*Primary Examiner* — Joseph P Hirl
*Assistant Examiner* — Leynna T Truvan
(74) *Attorney, Agent, or Firm* — LeRoy D. Maunu

(57) ABSTRACT

The disclosure describes approaches for generating a physically unclonable function (PUF) value. Power is applied to a power control circuit, an SRAM, and a PUF control circuit. After initially powering-up the SRAM, the PUF control circuit signals the power control circuit to disable power to the SRAM. The power control circuit disables power to the SRAM, and then re-enables power to the SRAM after having power to the SRAM disabled for a waiting period. The PUF control circuit reads a PUF value from the SRAM by the PUF control circuit after the enabling of power.

18 Claims, 5 Drawing Sheets

SRAM PHYSICALLY UNCLONABLE FUNCTION (PUF) CIRCUIT AND METHOD

TECHNICAL FIELD

The disclosure generally relates to an SRAM-based physically unclonable function (PUF) circuit and method.

BACKGROUND

A system's identity may be established and authenticated based on the unique physical properties of the system. In some applications, physically unclonable functions (PUFs) embodied in integrated circuits (ICs) are used to exploit the unique physical characteristics of a system for purposes of authentication. Each instance of the IC will have slightly different physical characteristics due to the random variation in an IC fabrication process. A PUF circuit uses the physical characteristics to generate an identifier value, for example a binary number, which differs from one integrated circuit to the next due to the different physical characteristics of each manufactured device. These identifier values may be used to uniquely identify the integrated circuit, as a key for encryption and decryption, or for other purposes. Examples of circuits used to implement PUFs include delay circuits and ring oscillators, SRAMs, and cross-coupled latches. The terms PUF circuit and PUF may be used interchangeably herein.

PUFs may operate according to a challenge-response protocol. The input to a PUF is the challenge, and the output from the PUF is the response. The slight variations between instances of the PUF circuits in different systems result in the separate instances providing different responses to the same challenge. In addition to identification and authentication, PUF circuits may be used to generate volatile secret keys.

PUFs may be used to protect against unauthorized use of a circuit implemented in programmable logic of a System on Chip (SOC) or a field programmable gate array (FPGA), for example. An efficient implementation of a PUF is desirable in order to contain product costs. An implementation of a PUF that occupies considerable die area may add significantly to the cost of a product without enhancing functionality of the product. In some instances, programmable logic that is unused in implementing a circuit design on a device may be used to implement a PUF. For example, a ring-oscillator PUF may be implemented on unused look-up tables (LUTs) of programmable logic.

SUMMARY

In one approach, a method is provided for generating a physically unclonable function (PUF) value. The method includes applying power to a power control circuit, an SRAM, and a PUF control circuit. After the SRAM has been powered-on, the PUF control circuit signals the power control circuit to disable power to the SRAM, and the power control circuit disables power to the SRAM. The PUF control circuit then waits for erasure of the SRAM after the disabling of power. After waiting for erasure with the SRAM powered-down, the PUF control circuit signals the power control circuit to enable power to the SRAM. The power control circuit enables power to the SRAM in response to the signaling from the PUF control circuit, and the PUF control circuit then reads the PUF value from the SRAM and outputs the PUF value.

In another embodiment, a circuit arrangement includes a power control circuit, an SRAM coupled to the power control circuit, and a physically unclonable function (PUF) control circuit coupled to the power control circuit and to the SRAM. The power control circuit is configured and arranged to apply power to the SRAM and PUF control circuit during a power-up sequence, disable power to the SRAM only in response to an SRAM-power-down signal, and enable power to the SRAM in response to an SRAM-power-up signal. The PUF control circuit is configured and arranged to generate the SRAM-power-down signal after application of power to the SRAM in the power-up sequence, wait for erasure of the SRAM after generating the SRAM-power-down signal, generate the SRAM-power-up signal after the waiting, and read a PUF value from the SRAM by the PUF control circuit after generation of the SRAM-power-up signal and enabling of power to the SRAM. The PUF control circuit may then output the PUF value.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

Figure 1:
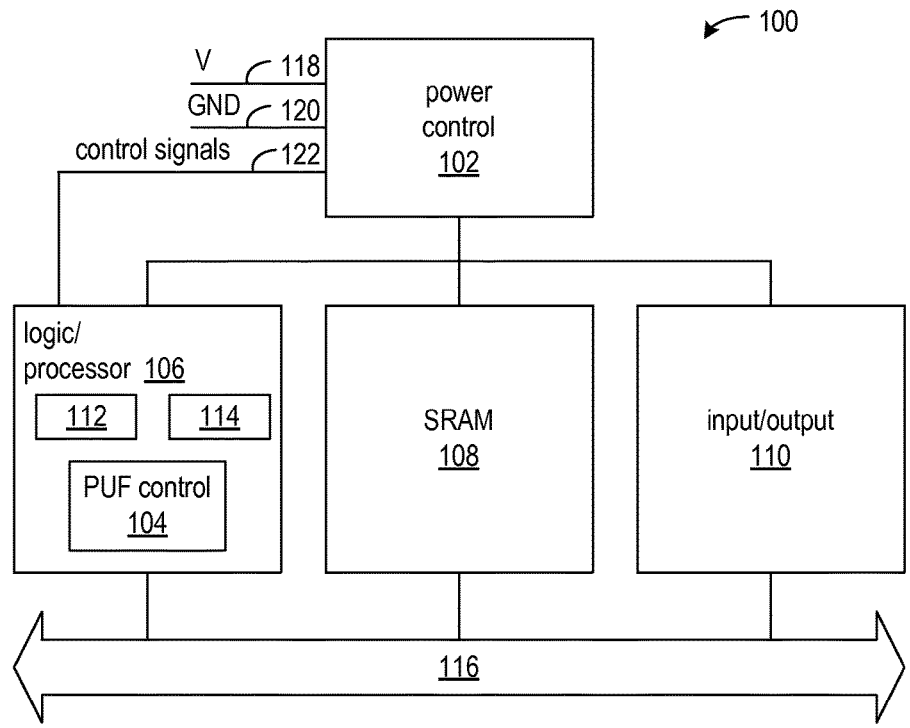
FIG. 1 shows a circuit arrangement having an SRAM-based PUF.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

For some applications, a device such as an FPGA or SOC may have insufficient unused programmable logic resources to implement a PUF. That is, after a circuit design has been implemented in the programmable logic resources, the programmable logic resources that are unused in implementing the circuit design may be insufficient to implement a PUF.

Though a device may have insufficient programmable logic resources for a PUF, other resources of the device may be suitable for a PUF. For example, some devices have blocks of RAM (BRAMs) of various sizes, which may be implemented with SRAM circuitry. The BRAMs may be accessed by circuitry implemented in the programmable logic and/or by a processor on the device. Multiple BRAMs may be combined into a single address space, or individual BRAMs may be dedicated to different functions of the integrated circuit. The implementation of a circuit in programmable logic resources of the device may not leave enough resources for a PUF. However, BRAM resources may be unused and available for a PUF. A BRAM may be partially-used with unused RAM memory space. A BRAM may be unused at certain times, such as during startup, and that BRAM may be used at those times for other purposes, such as a PUF.

In some devices, the power-up and booting of the device entail some functions performed for the convenience of circuits implemented on the device. However, those functions may interfere with use of a BRAM in a PUF. For example, on power-up and booting of some devices, the BRAMs are automatically initialized, which places the BRAMs in a known state for logic functions implemented on the device. The BRAMs cannot be read until after the boot sequence is complete and the BRAMs have been initialized. Once initialized, however, a BRAM is unsuitable in a PUF, because the random state of the BRAM has been overwritten.

In the disclosed methods and circuits, the SRAM that implements a BRAM is used in a PUF even though the SRAM has been initialized. In some devices, such as SOCs and FPGAs from XILINX®, Inc., power saving features of the devices allow individual BRAMs to be powered-down if they are not needed while other parts of the device remain powered and operational. Individual BRAMs may also be powered-up, after having been powered-down, if the BRAMs become necessary to support functions of the application circuitry implemented on the device. The power control over an individual BRAM may be advantageous in using the SRAM-based BRAM in a PUF circuit.

In a method of using SRAM in a PUF, power is applied to a circuit arrangement that includes the SRAM. In addition to the SRAM, the circuit arrangement also includes a PUF control circuit and a power control circuit. The circuit arrangement may further include programmable logic, one or more processors and input/output circuits, which are also powered-up when power is applied. The PUF control circuit signals the power control circuit to disable power to the SRAM after the device is powered-up, and the power control circuit disables power to the SRAM.

As the SRAM may have been initialized during the power-up and boot sequence, the process waits a suitable period of time while power to the SRAM is disabled before re-enabling power to the SRAM. The waiting period ensures that the SRAM is no longer in the initialized state. After waiting for a period with the SRAM in a power down state and re-enabling power to the SRAM, a value is read from the SRAM and is used as a PUF value.

The time period for which power is disabled to the SRAM while other circuitry of the device remains operational should be of sufficient duration to prevent the previously initialized values in the SRAM from remaining when power to the SRAM is re-enabled. In one approach, the waiting period may be for a prescribed period of time, which may be determined through prior simulation or testing of the device. Alternatively, the waiting period can be determined while the device is operating by using part of the SRAM as a remanence memory and cycling power to the SRAM with increasing wait periods until data in the remanence memory indicates the initialized values are no longer retained after power-up.

FIG. 1 shows a circuit arrangement 100 having an SRAM-based PUF. The circuit arrangement includes power control circuit 102, PUF control circuit 104, SRAM 108, and input/output circuitry 110. The PUF control circuit may be implemented on programmable logic circuitry, a microprocessor, or an application specific integrated circuit or a combination thereof, which are represented as block 106. Additional application-specific functions may be implemented as circuits 112 and 114 on the logic/processor circuit 106. The logic/processor circuit, SRAM, and input/output circuitry are communicatively coupled by way of bus 116, which may carry data, address and control signals. The power control circuit 102 generally connects supply 118 and ground 120 voltages to the logic/processor 106, SRAM 108, and input/output circuitry 110. The SRAM 108 may include multiple BRAMs (not shown), one or more of which is used for the PUF. Responsive to control signals 122 from the PUF control circuit 104, the power control circuit 102 enables or disables power to selected ones of the BRAMs.

In some implementations, when the circuit arrangement is initially powered-up and the logic/processor 106, SRAM 108, and input/output circuit 110 move from a powered-off state to a powered-on state, the circuit arrangement may perform a boot sequence in which the SRAM 108 is initialized to a known state. The PUF control circuit 104 may be inoperative until after the boot sequence is complete. Thus, once the boot sequence is complete and the SRAM is initialized, the SRAM in the initialized state is unsuitable for providing a PUF value.

The PUF control circuit 104 exploits the individual power control over the BRAMs of the SRAM 108 to use one or more of the BRAMs in a PUF even though the BRAMs are initialized. After power has been applied to the power control circuit 102, SRAM, and logic/processor 106 and the boot sequence is complete, the PUF control circuit 104 signals the power control circuit to disable power to one or more BRAMs of the SRAM. The power control circuit responds by disabling power to the selected BRAMs, and the logic/processor, power control circuit, unselected ones of the BRAMs of the SRAM, and the input/output circuitry remain powered-on and operational while the selected BRAMs are de-powered. After having power to the selected BRAMs disabled for a waiting period, the PUF control circuit signals the power control circuit to enable power to the BRAMs. After the selected BRAMs have powered-on, the PUF control circuit reads a value from the selected BRAMs to use as the PUF value.

Figure 2:
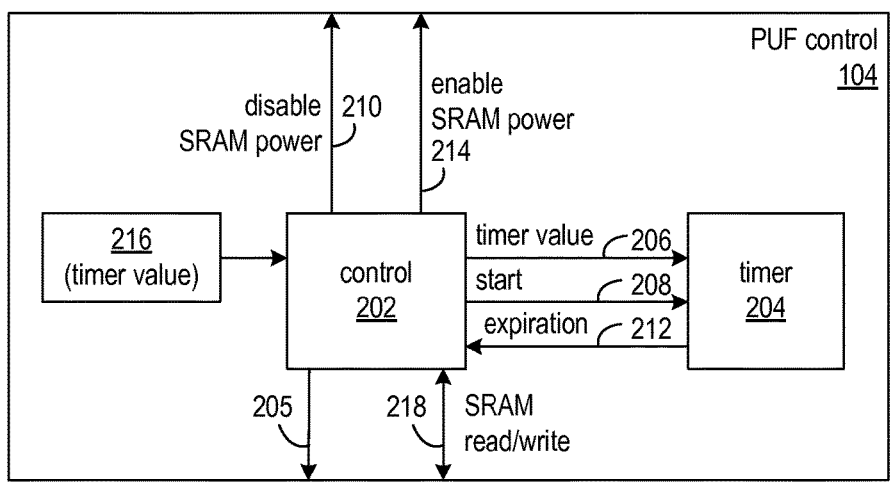
FIG. 2 shows a PUF control circuit.

FIG. 2 shows a PUF control circuit 104. The PUF control circuit includes a control circuit 202 and a timer circuit 204. The PUF control circuit generally signals the power control circuit to enable and disable power to selected BRAM(s) of the SRAM 108, controls the period of time to wait between disabling power to the selected BRAM(s) and enabling power to the selected BRAM(s), and reads the PUF value from the selected BRAM(s). The PUF value may be output on signal line 205 to circuits 112 or 114, for example, to be used in authentication and/or encryption and decryption processes.

The control circuit 202 uses the timer circuit 204 to time the period between when power to the selected BRAM(s) is disabled and power to the selected BRAM(s) is enabled. The timer circuit may be implemented as a counter circuit, and the control circuit controls the timer circuit by providing a timer value 206 and a start signal 208 when the disable SRAM power signal 210 is asserted. The timer circuit counts up to or down from the timer value and asserts the expiration signal 212 when the end count is reached. In response to the expiration signal, the control circuit asserts the enable SRAM power signal 214.

The timer value 206 may be read from a memory circuit 216, such as a register, or alternatively calculated by the control circuit 202. In one implementation, the waiting period may be determined through simulation or live testing of a BRAM to determine the period of time required for initialized values in the BRAM to be erased after having been powered-down. A timer value indicative of the determined time period may be stored in the memory circuit 216 such as through channels for loading configuration data into programmable logic resources or through a boundary scan chain, for example.

In another implementation, the timer value 206 may be calculated by the control circuit 202 through data remanence techniques, which eliminates the need for the timer value configured in the memory circuit 216. The control circuit 202 initializes a portion of SRAM with a known set of values by issuing write transactions over the SRAM read/write channel 218 to the SRAM 108. The write transactions address one or more BRAMs of the SRAM. The BRAM(s), or portions thereof, used for data remanence checking may be the same BRAM(s) or separate from the BRAM(s) from which the PUF value is read. After storing the known set of values in the BRAM(s), the control circuit asserts the disable SRAM power signal 210, and starts the timer circuit 204 with an initial timer value. When the timer circuit indicates that the time period has expired, the control circuit asserts the enable SRAM power signal 214 to enable power to the one or more BRAMs.

After the BRAM(s) have powered-on, the control circuit 202 issues read transactions over the SRAM read/write channel, addressing the known set of values in the BRAM (s). The control circuit 202 compares the values read from the BRAM(s) to the known set of values. A large number of differences between the values read and the known set of values is indicative that the BRAM(s) have been powered-down long enough for the initialized values to have been effectively erased, and a smaller number of differences between the values read and the known set of values is indicative that the BRAM(s) have not been powered-down long enough for the initialized values to have been erased. If the number of differences between the values read and the known set of values is less than a threshold, the control circuit increases the waiting period by increasing the timer value input to the timer circuit and repeats the storing of the known set of values in the BRAM(s), disabling of power to the BRAM(s), starting the timer and waiting for the timer to indicate the increased waiting period has expired, enabling power to the BRAM(s), reading from the BRAM(s), and comparing the values read to the known set of values. Once the number of differences between the values read and the known set of values is greater than the desired threshold, the PUF value may be read from the SRAM by the control circuit 202. Otherwise, the control circuit repeats the process with an increased waiting period with each iteration.

In an example implementation, the timer value 206 may be doubled with each iteration. Also, the known set of values may include logic 0 values in a first portion of the BRAM(s) and logic 1 values in a second portion of the BRAMs. The number of differences between the known values and the values read from the BRAM(s) may be the number of bit values that are different.

Figure 3:
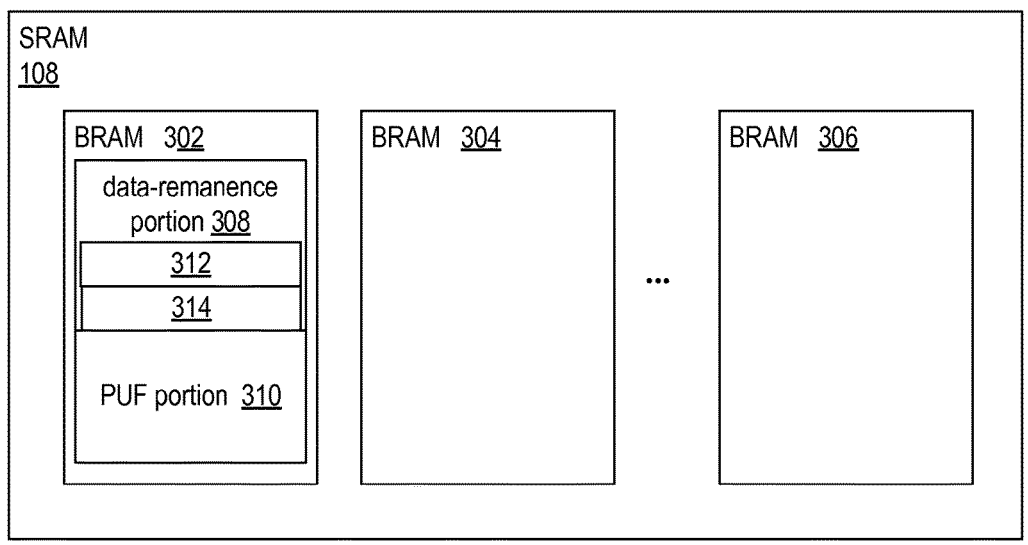
FIG. 3 shows an SRAM memory arrangement that includes multiple blocks of RAM (BRAMs)

FIG. 3 shows an SRAM memory arrangement 108 that includes multiple blocks 302, 304, and 306 of RAM (BRAMs). Each of blocks 302, 304, and 306 is referred to as a BRAM. Power to the BRAMs may be separately controlled by the power control circuit 102 (FIG. 1). One or more of the BRAMs may be used in a PUF. For ease of exposition, only BRAM 302 is shown as being used in a PUF.

BRAM 302 includes a data-remanence portion 308 and a PUF portion 310. In the illustrated embodiment, the data-remanence portion and the PUF portion are separate and occupy disjoint address spaces. In other embodiments, the address spaces of the data-remanence portion and the PUF portion may intersect, the address space of the data-remanance portion may be wholly contained within the address space of the PUF portion, or the address space of the PUF portion may be wholly contained within the address space of the data-remanance portion.

The data-remanence portion 308 includes sub-portions 312 and 314. The sub-portions may be initialized to different logic values, such as logic 0 values in sub-portion 312 and logic 1 values in sub-portion 314. The address space of sub-portion 312 may be interleaved with address space of sub-portion 314. For example, the addresses of the sub-portion 312 may be even addresses within an address range, and the addresses of sub-portion 314 may be odd addresses within an address range. Alternatively, the address spaces may be non-interleaved.

The PUF control circuit 104 (FIG. 1) uses the data remanence portion 104 in determining whether or not power to the BRAM 302 has been disabled for a sufficient period of time to allow initialized values in the PUF portion 310 to be erased. As described above, the PUF control circuit stores a set of known values in the data-remanence portion 308, signals the power control circuit 102 (FIG. 1) to disable power to the BRAM 302, waits for a period of time while the BRAM 302 is powered-down, signals the power control circuit to enable power to the BRAM 302, reads values from the data-remanence portion, and compares the read values to the known set of values to determine whether or not the BRAM 302 was powered-down long enough to erase the values in the data-remanence portion 308 and therefore also the PUF portion 310. When BRAM 302 is powered-down, BRAMs 304 and 306 may remain powered-up as those BRAMs may be needed to implement parts of a circuit design.

Figure 4:
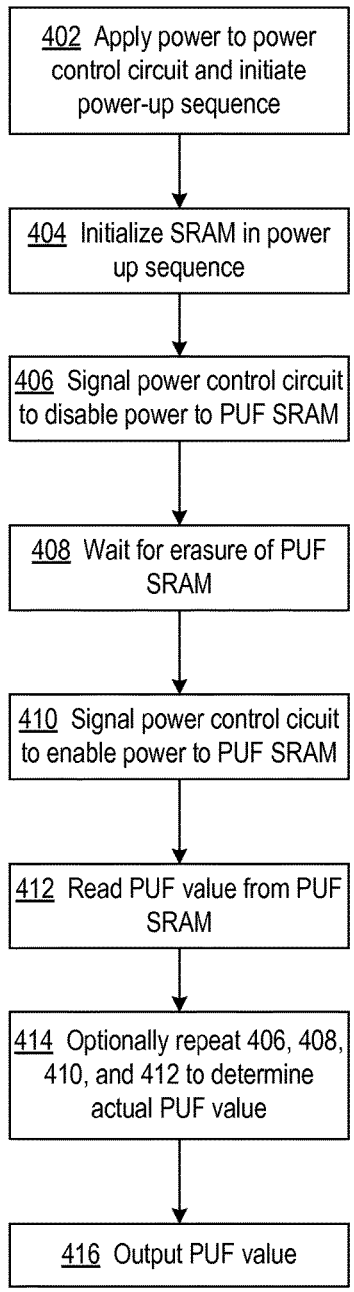
FIG. 4 shows a flowchart of a process of generating a PUF value.

FIG. 4 shows a flowchart of a process of generating a PUF value. At block 402, power is applied to a circuit arrangement including a power control circuit, a PUF control circuit, and SRAM for use as a PUF. Multiple BRAMs may be implemented with SRAM, and the SRAM used as the PUF may be a partial one, a full one or multiple ones of the BRAMs. The BRAM(s) that have the SRAM used as the PUF may be determined at the time a circuit design is compiled into configuration data for programming resources of a programmable IC. One or more of the BRAMs that are not used in implementing the circuit design may be used to implement the PUF. Application of power initiates a power-up and boot sequence in the circuit arrangement. As part of the boot sequence, the SRAM is initialized at block 404. For example, the SRAM may be initialized to all logic 0 values in order to place the SRAM in a known state for use by application software and circuits once the power-up and boot sequences are complete.

Once the PUF control circuit is operational, at block 406 the PUF control circuit signals the power control circuit to disable power to the PUF SRAM, which is the portion of the SRAM used in the PUF, and the power control circuit disables power to the PUF SRAM. At block 408, the PUF control circuit waits for values in the PUF SRAM to be erased due to lack of power.

Once the PUF control circuit has waited a sufficient period of time, at block 410, the PUF control circuit signals the power control circuit to enable power to the PUF SRAM. At block 412, the PUF control circuit reads the PUF value from the PUF SRAM. As indicated by block 414, the processing of blocks 406, 408, 410, and 412 may be repeated some number of times to determine an actual PUF value, because the PUF SRAM may become unstable over time or with varying environmental factors. At block 416, the PUF value may be output to be used in authentication and/or encryption and decryption processes, for example.

Figure 5:
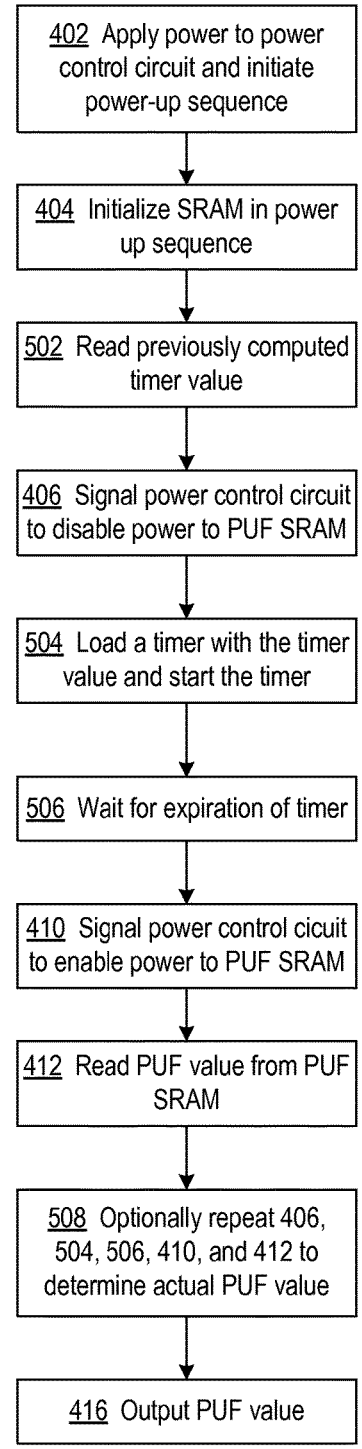
FIG. 5 shows a flowchart of a process of generating a PUF value based on disabling power to an SRAM and waiting for a predetermined period of time before enabling power to the SRAM and reading the PUF value.

FIG. 5 shows a flowchart of a process of generating a PUF value based on disabling power to an SRAM and waiting for a predetermined period of time before enabling power to the SRAM and reading the PUF value. The processing of blocks 402 and 404 in FIG. 5 is as described for the same blocks in FIG. 4.

At block 502, the PUF control circuit reads a previously computed timer value that was determined to be indicative of a sufficient period of time for the PUF SRAM to be erased after power is removed. The PUF control circuit signals the power control circuit to disable power to the PUF SRAM at block 406 and as described above. At block 504, the timer value is input to a timer circuit, and the timer circuit is started. The PUF control circuit then waits at block 506 for the timer circuit to indicate that a sufficient period of time has passed based on the input timer value. After waiting with power to the PUF SRAM disabled, at block 410 the PUF control circuit signals the power control circuit to enable power to the PUF SRAM. At block 412, the PUF control circuit reads the PUF value from the PUF SRAM. As indicated by block 508, the processing of blocks 406, 504, 506, 410, and 412 may be repeated some number of times to determine an actual PUF value, because the PUF SRAM may become unstable over time or with varying environmental factors. At block 416, the PUF value may be output to be used in authentication and/or encryption and decryption processes, for example.

Figure 6:
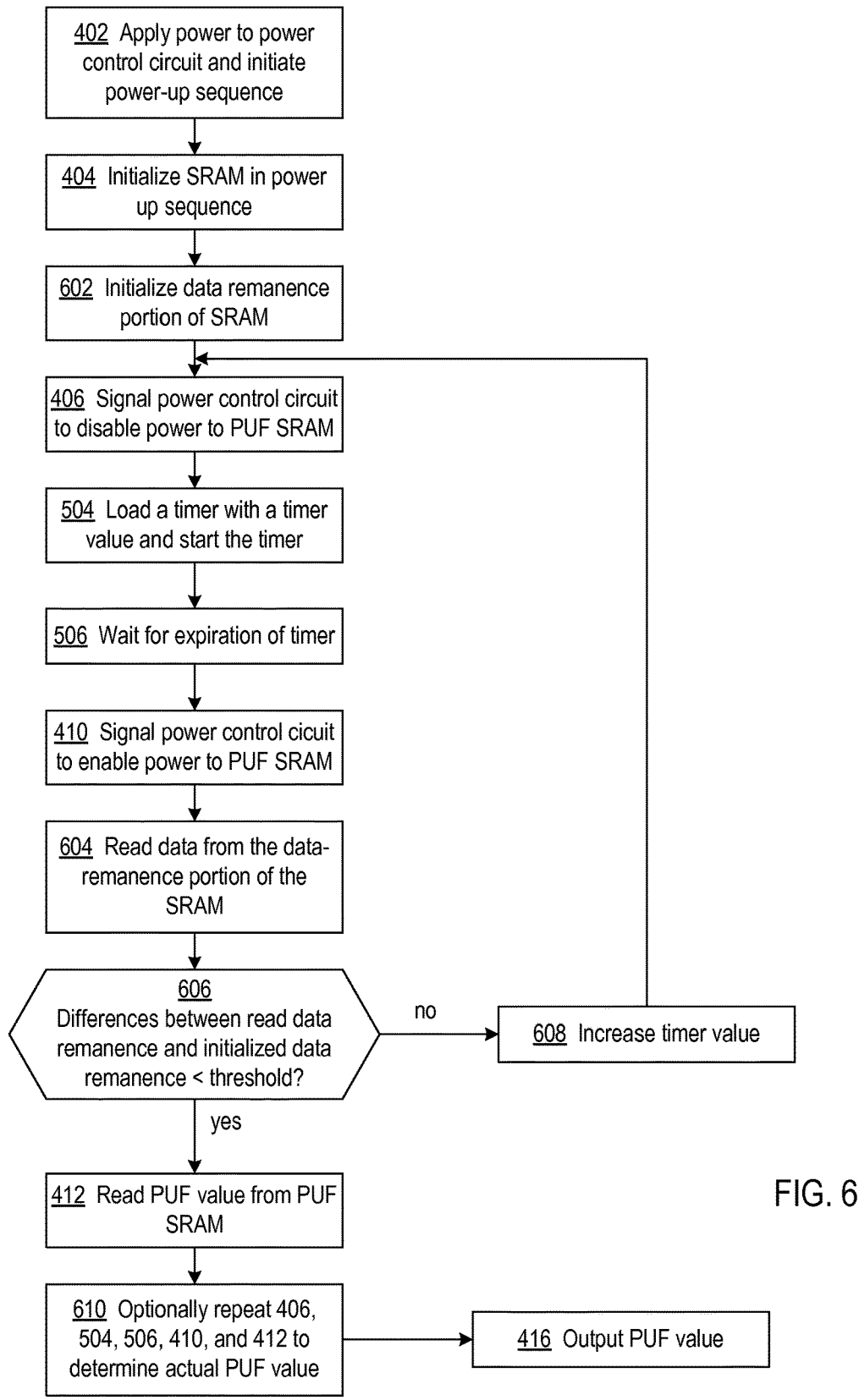
FIG. 6 shows a flowchart of a process of generating a PUF value based on presetting values in a data-remanence portion of an SRAM before disabling power to an SRAM, reading from the data-remanence portion of the SRAM after enabling power to the SRAM, and determining whether or not the SRAM has settled for a sufficient period to read the PUF value.

FIG. 6 shows a flowchart of a process of generating a PUF value based on presetting values in a data-remanence portion of an SRAM before disabling power to an SRAM, reading from the data-remanence portion of the SRAM after enabling power to the SRAM, and determining whether or not the SRAM has settled for a sufficient period to read the PUF value. The processing of blocks 402 and 404 in FIG. 6 is as described for the same blocks in FIG. 4.

At block 602, a data-remanence portion of SRAM is initialized with a known set of values. A first sub-portion of the data-remanence portion may be initialized with logic 0 values, and a second sub-portion of the data-remanence portion may be initialized with logic 1 values. The data-remanence portion of SRAM may be the same as or separate from the PUF SRAM as described above. The PUF control circuit signals the power control circuit to disable power to the PUF SRAM at block 406 as described above. At block 504, the timer value is input to a timer circuit, and the timer circuit is started. The PUF control circuit then waits at block 506 for the timer circuit to indicate that a sufficient period of time has passed based on the input timer value. After waiting with power to the PUF SRAM disabled, at block 410 the PUF control circuit signals the power control circuit to enable power to the PUF SRAM.

At block 604, the PUF control circuit reads data from the data-remanence portion of the SRAM. Decision block 606 compares the set of known values to the data read from the data-remanence portion and determines whether the differences between the data values number less than a threshold. The comparison may be bit-to-bit between the values of two data sets, and the differences may be characterized by the number of comparisons indicating unequal bits. The comparison of the differences to the threshold may be based on raw numbers or percentages. The threshold may be determined through simulation or live testing.

If the differences are less than the threshold, the timer value is increased at block 608, and the process repeats at block 406 with the increased timer value. In one implementation, the timer value may be doubled with each iteration. If the differences are not less than the threshold, the process is directed to block 412 where the PUF value is read from the PUF SRAM. As indicated by block 610, the processing of blocks 406, 504, 506, 410, and 412 may be repeated some number of times to determine an actual PUF value, because the PUF SRAM may become unstable over time or with varying environmental factors. At block 416, the PUF value may be output to be used in authentication and/or encryption and decryption processes, for example.

Figure 7:
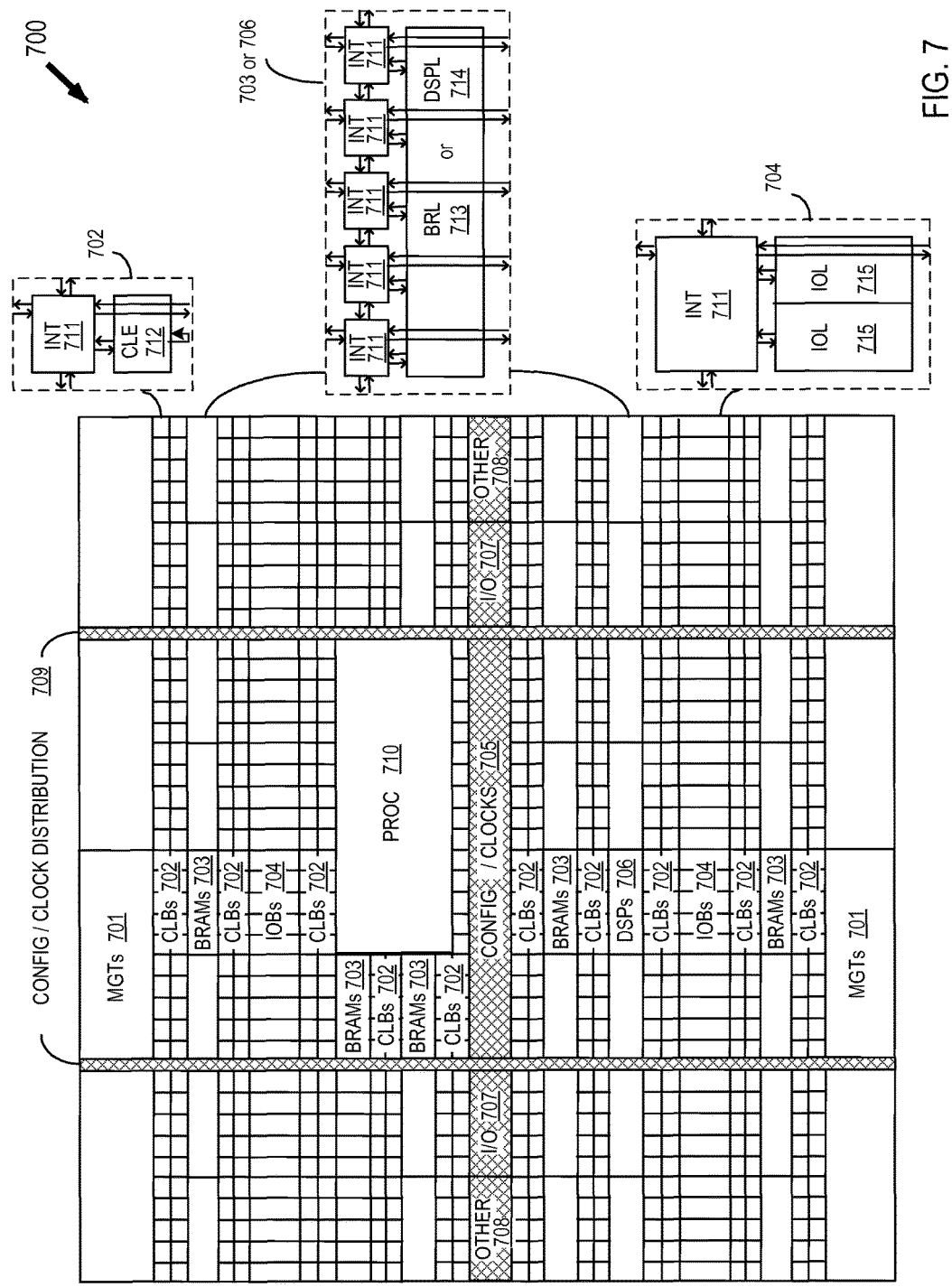
FIG. 7 shows an example programmable logic IC on which the disclosed PUF circuitry and processes may be implemented.

FIG. 7 shows an example programmable logic IC 700 on which the disclosed PUF circuitry and processes may be implemented. The programmable logic and interconnect circuitry, as described further below, may be configured to implement the PUF control circuit 104 of FIG. 1. Alternatively, the processor 710 may be configured to execute software to implement the PUF control circuit. One or more of the BRAMs 703 may implement the BRAMs used for the PUF and data remanence values. The configuration circuitry 705 may perform the boot sequence that initializes the BRAMs 703.

Field programmable gate arrays (FPGAs) can include several different types of programmable logic blocks in the array. For example, the architecture of FIG. 7 includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), specialized input/output blocks (I/O 707), for example, e.g., clock ports, and other programmable logic 708 such as power control circuitry, digital clock managers, analog-to-digital converters, system monitoring logic, and so forth. Some FPGAs also include dedicated processor blocks (PROC 710) and internal and external reconfiguration ports (not shown).

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic plus a single programmable interconnect element INT 711. A BRAM 703 can include a BRAM logic element (BRL 713) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 706 can include a DSP logic element (DSPL 714) in addition to an appropriate number of programmable interconnect elements. An IOB 704 can include, for example, two instances of an input/output logic element (IOL 715) in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured FPGA, a horizontal area near the center of the die (shown shaded in FIG. 7) is used for configuration, clock, and other control logic. Vertical areas 709 extending from this horizontal area are used to distribute the clocks and configuration signals across the breadth of the FPGA.

Some FPGAs utilizing the architecture illustrated in FIG. 7 include additional logic blocks that disrupt the regular row structure making up a large part of the FPGA. The additional logic blocks can be programmable blocks and/or dedicated logic. For example, the processor block PROC 710 shown in FIG. 7 spans several rows of CLBs and BRAMs.

Note that FIG. 7 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for authentication. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of generating a physically unclonable function (PUF) value, comprising:
    applying power to a power control circuit, an SRAM, and a PUF control circuit;
    inputting by the PUF control circuit a value indicative of a duration of the waiting period;
    initializing the SRAM after the applying of power to the SRAM;
    signaling the power control circuit by the PUF control circuit to disable power to the SRAM after the initializing of the SRAM;
    disabling power to the SRAM by the power control circuit in response to the signaling from the PUF control circuit while maintaining power to the power control circuit and the PUF control circuit;
    starting the timer circuit in response to the disabling power;
    waiting for a timer circuit to signal expiration of a waiting period for erasure of the SRAM after the disabling of power;
    signaling the power control circuit by the PUF control circuit to enable power to the SRAM in response to the signal from the timer circuit;
    enabling power to the SRAM by the power control circuit in response to the signaling from the PUF control circuit;
    reading the PUF value from the SRAM by the PUF control circuit after the enabling of power; and
    outputting the PUF value from the PUF control circuit.

2. The method of claim 1, wherein the inputting includes reading by the PUF control circuit from a memory circuit value indicative of the duration of the waiting period.

3. The method of claim 1, further comprising:
    storing a first set of values in a data-remanence portion of the SRAM prior to disabling power to the SRAM;
    starting the timer circuit, wherein the timer circuit indicates expiration of the waiting period;
    before reading the PUF value:
        reading a second set of values from the data-remanence portion of the SRAM by the PUF control circuit after the enabling of power to the SRAM;
        comparing the first set of values to the second set of values by the PUF control circuit; and
        in response to a difference between the first and second sets of values being less than a threshold:
        increasing the waiting period, and
        repeating the storing the first set of values, disabling of power, starting of the timer, enabling of power, reading and comparing.

4. The method of claim 3, wherein the data-remanence portion of the SRAM is disjoint from a portion of the SRAM from which the PUF value is read.

5. The method of claim 3, wherein the data-remanence portion of the SRAM intersects a portion of the SRAM from which the PUF value is read.

6. The method of claim 3, wherein the increasing of the waiting period doubles the waiting period.

7. The method of claim 3, wherein the storing of the first set of values includes storing logic 0 values in a first sub-portion of the data-remanence portion of the SRAM and storing logic 1 values in a second sub-portion of the data-remanence portion of the SRAM.

8. The method of claim 3, wherein the comparing includes determining a number of bit values that are different between the first set of values and the second set of values.

9. The method of claim 1, further comprising configuring programmable logic of a programmable integrated circuit (IC) to implement the PUF control circuit.

10. The method of claim 1, further comprising executing software on a processor of the programmable IC in an implementation of the PUF control circuit.

11. The method of claim 1, wherein the SRAM includes a plurality of block random access memories (BRAMs), and the method further comprises:
    determining one or more of the BRAMs unused in implementing a circuit design; and
    using the one or more BRAMs to implement the PUF.

12. The method of claim 11, wherein:
    the disabling power to the SRAM includes disabling power to the one or more BRAMs and not disabling power to others of the plurality of BRAMs; and the enabling power to the SRAM includes enabling power to the one or more BRAMs.

13. A circuit arrangement, comprising:
a power control circuit;
an SRAM coupled to the power control circuit;
a physically unclonable function (PUF) control circuit coupled to the power control circuit and to the SRAM;
wherein:
the power control circuit is configured and arranged to:
apply power to the SRAM and PUF control circuit during a power-up sequence,
disable power to the SRAM only in response to an SRAM-power-down signal, and
enable power to the SRAM in response to an SRAM-power-up signal; and
the PUF control circuit is configured and arranged to:
input a value indicative of a duration of the waiting period;
generate the SRAM-power-down signal after application of power to the SRAM in the power-up sequence,
start the timer circuit in response to generation of the SRAM-power-down signal;
wait for a timer circuit to signal expiration of a waiting period for erasure of the SRAM after generating the SRAM-power-down signal,
generate the SRAM-power-up signal in response to the signal from the timer circuit,
read a PUF value from the SRAM by the PUF control circuit after generation of the SRAM-power-up signal and enabling of power to the SRAM, and
output the PUF value; and
a configuration circuit coupled to the SRAM and configured and arranged to configure the SRAM with initial values after application of power to the SRAM during the power-up sequence and before the power control circuit disables power to the SRAM.

14. The circuit arrangement of claim 13, wherein the PUF control circuit is further configured and arranged to
read from a memory circuit the value indicative of the duration of the waiting period.

15. The circuit arrangement of claim 13, wherein the PUF control circuit is further configured and arranged to:
store a first set of values in a data-remanence portion of the SRAM prior to disabling power to the SRAM;
start the timer circuit after generation of the SRAM-power-down signal, wherein the timer circuit indicates expiration of the waiting period;
before reading the PUF value:
read a second set of values from the data-remanence portion of the SRAM after the enabling of power to the SRAM;
compare the first set of values to the second set of values; and
in response to a difference between the first and second sets of values being less than a threshold:
increase the waiting period, and
repeat the store of the first set of values, disable of power, start of the timer, enable of power, read of the second set of values and compare of the first and second sets of values.

16. The circuit arrangement of claim 15, wherein the increase of the waiting period doubles the waiting period.

17. The circuit arrangement of claim 15, wherein the first set of values includes logic 0 values in a first sub-portion of the data-remanence portion of the SRAM and logic 1 values in a second sub-portion of the data-remanence portion of the SRAM.

18. The circuit arrangement of claim 15, wherein the difference between the first and second sets of values is a number of bit values that are different between the first set of values and the second set of values.

* * * * *